(12) United States Patent
Kasahara et al.

(10) Patent No.: US 12,019,465 B2
(45) Date of Patent: Jun. 25, 2024

(54) ELECTRONIC CONTROL DEVICE, CONTROL METHOD, AND SENSOR SYSTEM

(71) Applicant: HITACHI ASTEMO, LTD., Hitachinaka (JP)

(72) Inventors: Nozomi Kasahara, Tokyo (JP); Yutaka Uematsu, Tokyo (JP); Hideyuki Sakamoto, Hitachinaka (JP); Hidetatsu Yamamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 106 days.

(21) Appl. No.: 17/782,135

(22) PCT Filed: Sep. 17, 2020

(86) PCT No.: PCT/JP2020/035196
§ 371 (c)(1),
(2) Date: Jun. 2, 2022

(87) PCT Pub. No.: WO2021/111702
PCT Pub. Date: Jun. 10, 2021

(65) Prior Publication Data
US 2023/0004184 A1    Jan. 5, 2023

(30) Foreign Application Priority Data
Dec. 4, 2019   (JP) .................................. 2019-219475

(51) Int. Cl.
*G06F 1/10*   (2006.01)
*G06F 1/12*   (2006.01)
*H04J 3/06*   (2006.01)

(52) U.S. Cl.
CPC .................. *G06F 1/10* (2013.01); *G06F 1/12* (2013.01); *H04J 3/0638* (2013.01)

(58) Field of Classification Search
CPC ............ G06F 1/10; G06F 1/12; H04J 3/0638
See application file for complete search history.

(56) References Cited

U.S. PATENT DOCUMENTS

| 9,716,529 B1* | 7/2017 | Dai ................... H04L 25/03885 |
| 2007/0060059 A1* | 3/2007 | Kim ..................... H04B 1/7103 455/501 |

(Continued)

FOREIGN PATENT DOCUMENTS

| JP | 2002-366250 A | 12/2002 |
| JP | 2009-152966 A | 7/2009 |

(Continued)

OTHER PUBLICATIONS

International Search Report with English Translation and Written Opinion for PCT/JP2020/035196 dated Dec. 1, 2020.

*Primary Examiner* — Glenn A. Auve
(74) *Attorney, Agent, or Firm* — Foley & Lardner LLP

(57) ABSTRACT

An electronic control device is connected via a cable to each of a plurality of sensors which outputs a sensor output for each data acquisition cycle determined in advance in accordance with a clock signal. The electronic control device includes a power supply unit configured to supply power to the sensor via the cable, an acquisition unit configured to acquire a feature amount directly or indirectly indicating a magnitude of radiation noise from at least one sensor among the plurality of sensors, a phase difference decision unit configured to decide a phase difference of a data acquisition cycle for each of the plurality of sensors based on the feature amount, and a control unit configured to transmit the phase difference to each of the plurality of sensors.

15 Claims, 13 Drawing Sheets

(56) References Cited

U.S. PATENT DOCUMENTS

| | | | |
|---|---|---|---|
| 2009/0115477 A1* | 5/2009 | Lin | ........................ G09G 3/20 |
| | | | 327/161 |
| 2011/0221488 A1 | 9/2011 | Sasaki et al. | |
| 2013/0238264 A1* | 9/2013 | Kazama | ............... G01R 31/088 |
| | | | 702/59 |
| 2014/0160291 A1 | 6/2014 | Schaffner | |
| 2020/0177770 A1* | 6/2020 | Schaffner | ............... G06V 20/58 |

FOREIGN PATENT DOCUMENTS

| | | |
|---|---|---|
| JP | 2011-188415 A | 9/2011 |
| WO | WO 2016/167185 A1 | 10/2016 |

* cited by examiner

ELECTRONIC CONTROL DEVICE, CONTROL METHOD, AND SENSOR SYSTEM

TECHNICAL FIELD

The present invention relates to an electronic control device, a control method, and a sensor system.

BACKGROUND ART

In order to avoid adverse effects on the surroundings, the electronic device needs to suppress radiation noise.

PTL 1 discloses a clock signal adjustment circuit that inputs a clock signal whose phase is shifted to each circuit block that operates in synchronization with a specific clock obtained by arbitrarily dividing a semiconductor integrated circuit device. This clock signal adjustment circuit includes a clock generation unit that generates a clock signal, one or two or more delay elements that delay the clock signal, and a selector that selects an arbitrary clock signal from the clock signal or various clock signals delayed by the delay element in accordance with a control signal and inputs the selected clock signal to the circuit block.

CITATION LIST

Patent Literature

PTL 1: JP 2002-366250 A

SUMMARY OF INVENTION

Technical Problem

In the invention described in PTL 1, there is room for improvement in suppressing radiation noise.

Solution to Problem

An electronic control device according to the first aspect of the present invention is connected via a cable to each of a plurality of sensors which outputs a sensor output for each data acquisition cycle determined in advance in accordance with a clock signal. The electronic control device includes a power supply unit configured to supply power to the sensor via the cable, an acquisition unit configured to acquire a feature amount directly or indirectly indicating a magnitude of radiation noise from at least one sensor among the plurality of sensors, a phase difference decision unit configured to decide a phase difference of a data acquisition cycle for each of the plurality of sensors based on the feature amount, and a control unit configured to transmit the phase difference to each of the plurality of sensors.

A control method according to the second aspect of the present invention is executed by an electronic control device connected via a cable to each of a plurality of sensors which outputs a sensor output for each data acquisition cycle determined in advance in accordance with a clock signal and including a power supply unit configured to supply power to the sensor via the cable. The control method includes acquiring a feature amount directly or indirectly indicating a magnitude of radiation noise from at least one sensor among the plurality of sensors, deciding a phase difference of a data acquisition cycle for each of the plurality of sensors based on the feature amount, and transmitting the phase difference to each of the plurality of sensors.

A sensor system according to the third aspect of the present invention includes a plurality of sensors configured to output a sensor output for each data acquisition cycle determined in advance in accordance with a clock signal and an electronic control device connected to the plurality of sensors via a cable. The electronic control device includes a power supply unit configured to supply power to the sensor via the cable, an acquisition unit configured to acquire a feature amount directly or indirectly indicating a magnitude of radiation noise from at least one sensor among the plurality of sensors, a phase difference decision unit configured to decide a phase difference of a data acquisition cycle for each of the plurality of sensors based on the feature amount, and, a control unit configured to transmit the phase difference to each of the plurality of sensors.

Advantageous Effects of Invention

According to the present invention, radiation noise can be suppressed. Problems, configurations, and effects other than those described above will be clarified by the following description of embodiments.

DESCRIPTION OF EMBODIMENTS

Figure 1:
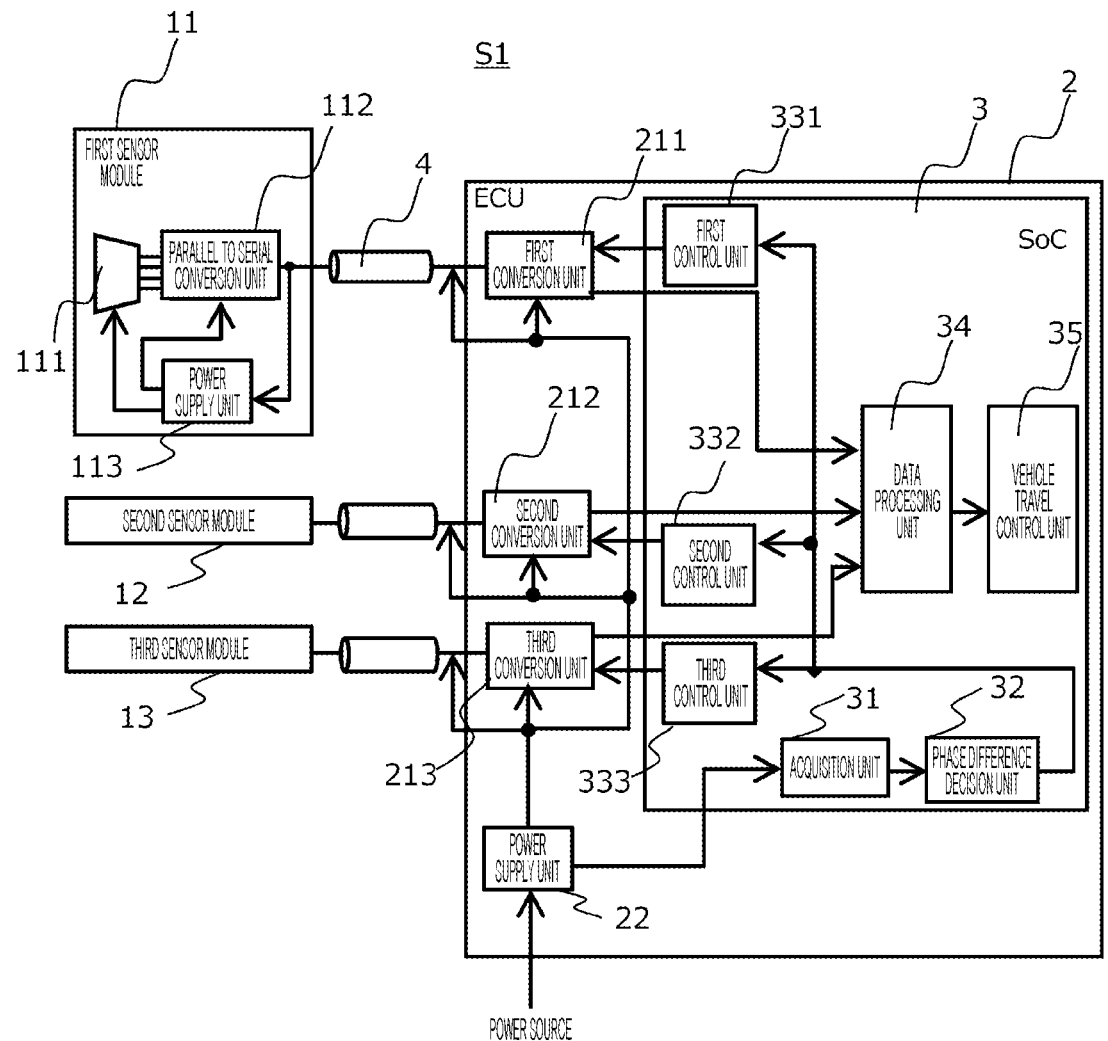
FIG. 1 is an overall configuration diagram of an in-vehicle system according to the first embodiment.

Embodiments of the present invention will be described below with reference to the accompanying drawings. The embodiments are examples for describing the present invention, and are simplified and with omissions, as appropriate, for the sake of clarity of description. The present invention can be carried out in various other forms. Unless otherwise specified, each component may be singular or plural.

Examples of various types of information may be described in terms of expressions such as "table", "list", and "queue", but various types of information may be expressed in a data structure other than these. For example, various types of information such as "XX table", "XX list", and "XX queue" may be "XX information". In describing identification information, expressions such as "identification information", "identifier", "name", "ID", and "number" are used, but these can be replaced with each other.

In a case where there is a plurality of components having the same or similar functions, the same reference numerals may be attached with different subscripts for description. In addition, in a case where it is not necessary to distinguish the plurality of components, a description may be made without any subscripts.

In the embodiment, processing performed by executing a program may be described. In this case, the computer executes a program by a processor (for example, a CPU or GPU), and performs processing defined by the program using a storage resource (for example, a memory), an interface device (for example, a communication port), and the like. Therefore, the subject of the processing performed by executing the program may be a processor. Similarly, the subject of the processing performed by executing the program may be a control unit, apparatus, system, computer, or node having a processor. The subject of the processing performed by executing the program may be an arithmetic unit, which may include a dedicated circuit that performs specific processing. In this case, the dedicated circuit is, for example, a field programmable gate array (FPGA), application specific integrated circuit (ASIC), or complex programmable logic device (CPLD).

The program may be installed from a program source into the computer. The program source may be, for example, a program distribution server or a computer-readable storage medium. When the program source is a program distribution server, the program distribution server may include a processor and a storage resource that stores a distribution target program, and the processor of the program distribution server may distribute the distribution target program to another computer. In addition, in the embodiment, two or more programs may be implemented as one program, or one program may be implemented as two or more programs.

First Embodiment

The first embodiment of an electronic control device will be described below with reference to FIGS. 1 to 7.

FIG. 1 is an overall configuration diagram of an in-vehicle system S1 including an ECU 2 which is an electronic control device. The in-vehicle system S1 performs integrated processing of data from a plurality of sensors built in the vehicle and performs automatic driving and driving support control of the vehicle. The in-vehicle system S1 includes a sensor module group 1, the ECU 2 that is an electronic control unit, and a transmission path 4.

The sensor module group 1 includes a first sensor module 11, a second sensor module 12, and a third sensor module 13. However, the number of sensor modules constituting the sensor module group 1 is not limited to three and may be two or more. The configurations of the respective sensor modules are common in the scope described below. The configuration of the first sensor module 11 will be described as a representative of the sensor module group 1.

The first sensor module 11 includes a sensor 111, a parallel to serial conversion unit 112, and a power supply unit 113. A specific configuration of the sensor 111 is not particularly limited. This sensor is, for example, a camera, millimeter wave radar, laser imaging detection and ranging (LIDAR), or ultrasonic sensor. Although the sensor is not particularly limited, a sensor in which an increase or decrease in power consumption repeatedly occurs in a certain time period is particularly effective. The sensors built in the first sensor module 11, the second sensor module 12, and the third sensor module 13 may be of different types.

However, in the present embodiment, the following configuration is assumed to describe a specific operation. That is, the description will be given assuming that the sensor included in the sensor module group 1 is a camera. In addition, it is assumed that the operation is performed 60 Hz and a photographed image obtained by photographing is output as a sensor output every 16.7 milliseconds. Hereinafter, one cycle in which the ECU 2 acquires a sensor output from the sensor module group 1 is also referred to as a "data acquisition cycle".

The parallel to serial conversion unit 112 converts a parallel signal to a serial signal. The sensor 111 inputs and outputs a parallel signal, but the transmission path 4 can transmit only a serial signal. For this reason, the parallel to serial conversion unit 112 mediates between the parallel signal and the serial signal. The parallel to serial conversion unit 112 converts the sensor output, which is output as a parallel signal by the sensor 111, into a serial signal and outputs the serial signal to the transmission path 4. The parallel to serial conversion unit 112 extracts a clock signal included in the serial signal received from the transmission path 4 and outputs the clock signal to the sensor 111. The parallel to serial conversion unit 112 is implemented by, for example, an application specific integrated circuit (ASIC).

The power supply unit 113 extracts power superimposed on the serial signal flowing through the transmission path 4 and supplies the power to the sensor 111 and the parallel to serial conversion unit 112. The power supply unit 113 is, for example, an inductor.

The ECU 2 includes a conversion unit 21, a power supply unit 22, and an SoC 3. The conversion unit 21 is a general term for a first conversion unit 211, a second conversion unit 212, and a third conversion unit 213. Each conversion unit 21 converts the sensor output output from the corresponding sensor module into a parallel signal and outputs the parallel signal to a data processing unit 34. Referring to FIG. 1, the number of the conversion units 21 and the number of the sensor modules of the sensor module group 1 correspond to each other on a one-to-one basis, but they do not necessarily have to correspond to each other on a one-to-one basis.

The power supply unit 22 is, for example, a DC-DC converter, converts power input from the outside into an appropriate voltage, and supplies power to the conversion unit 21 and the sensor module group 1. Although the power supplied from the outside to the power supply unit 22 is stable, it is inevitable that the voltage supplied by the power supply unit 22 is affected when the load of the sensor module group 1 fluctuates. In this case, radiation noise is generated from the transmission path 4 in accordance with the amount of change in the fluctuating voltage. For the purpose of reducing the radiation noise, a phase difference decision unit 32 adjusts the phase related to the operation of the sensor module group 1 as described later.

The SoC 3 is a system on a chip, that is, one semiconductor chip. However, it is not an essential requirement that the SoC 3 is constituted by one semiconductor chip. The SoC 3 may be implemented by a plurality of semiconductor chips or may be implemented by a microcomputer. The functional configuration described below may be implemented by a hardware circuit or may be implemented by a CPU (not illustrated) expanding a program stored in a ROM (not illustrated) in a RAM (not illustrated).

The SoC 3 includes an acquisition unit 31, a phase difference decision unit 32, a control unit 33, a data processing unit 34, and a vehicle travel control unit 35. The control unit 33 is a general term for a first control unit 331, a second control unit 332, and a third control unit 333. The acquisition unit 31 acquires a feature amount related to the magnitude of radiation noise from the sensor module group 1 via the power supply unit 22. In the present embodiment, the variation amount of the voltage supplied by the power supply unit 22 is set as a feature amount. More specifically, the power supply unit 22 outputs the instantaneous value of an output voltage to the acquisition unit 31, and the acquisition unit 31 calculates a variation amount. A voltage variation amount may be, for example, the difference between a maximum voltage value and a minimum voltage value in one data acquisition cycle, the sum of differences of voltage values every 0.1 milliseconds in one data acquisition cycle, or the square root of the sum of squares of a difference from an immediately previous voltage value in a predetermined sampling period in one data acquisition cycle.

The phase difference decision unit 32 decides a phase difference related to the operation timing of the sensor module group 1 based on the feature amount extracted by the acquisition unit 31. The control unit 33 controls the sensor module group 1 via the conversion unit 21 on the basis of the phase difference decided by the phase difference decision unit 32. The data processing unit 34 performs processing using the sensor output of the sensor module group 1 and outputs a processing result to the vehicle travel control unit 35. The vehicle travel control unit 35 performs travel control of the vehicle using the processing result obtained by the data processing unit 34.

The transmission path 4 has the following two functions. First, the transmission path 4 transmits the sensor output output from the sensor module group 1 to the ECU 2. Second, the transmission path 4 supplies power from the ECU 2 to the sensor module group 1.

Figure 2:
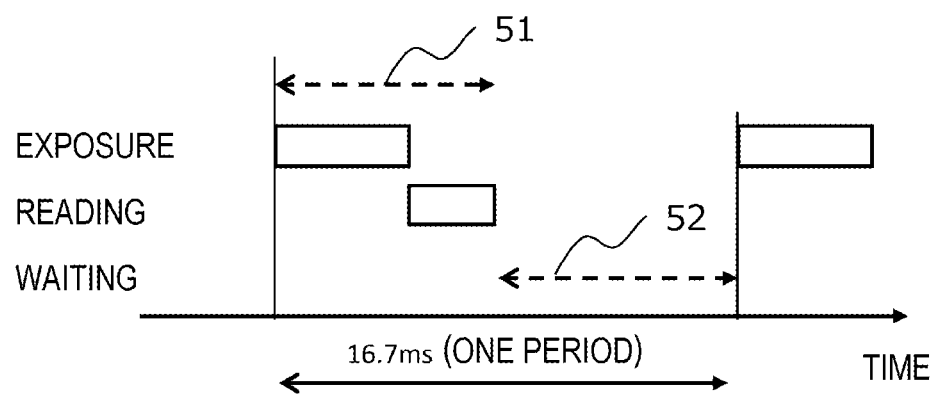
FIG. 2 is a schematic diagram illustrating an output of a first sensor module.

FIG. 2 is a schematic diagram illustrating an output of the first sensor module 11. Referring to FIG. 2, time passes from left to right in the drawing. The first sensor module 11 includes a camera as the sensor 111. As described above, the camera operates at, for example, 60 fps, that is, captures 60 frames per second. Therefore, as illustrated in FIG. 2, the first sensor module 11 performs exposure of the imaging element and data reading from the imaging element at a cycle of 16.7 milliseconds. Note that this data reading also includes data output to the ECU 2 by the parallel to serial conversion unit 112.

It is important that the first sensor module 11 executes processing in a predetermined cycle. Accordingly, after the reading is completed, the process waits until the start time of the next processing cycle. Then, at the time of the next processing cycle, exposure is started again, and the same processing is repeated thereafter. Hereinafter, a period during which exposure or reading is performed is referred to as a "processing period" 51, and a standby period is referred to as a "standby period" 52.

Figure 3:
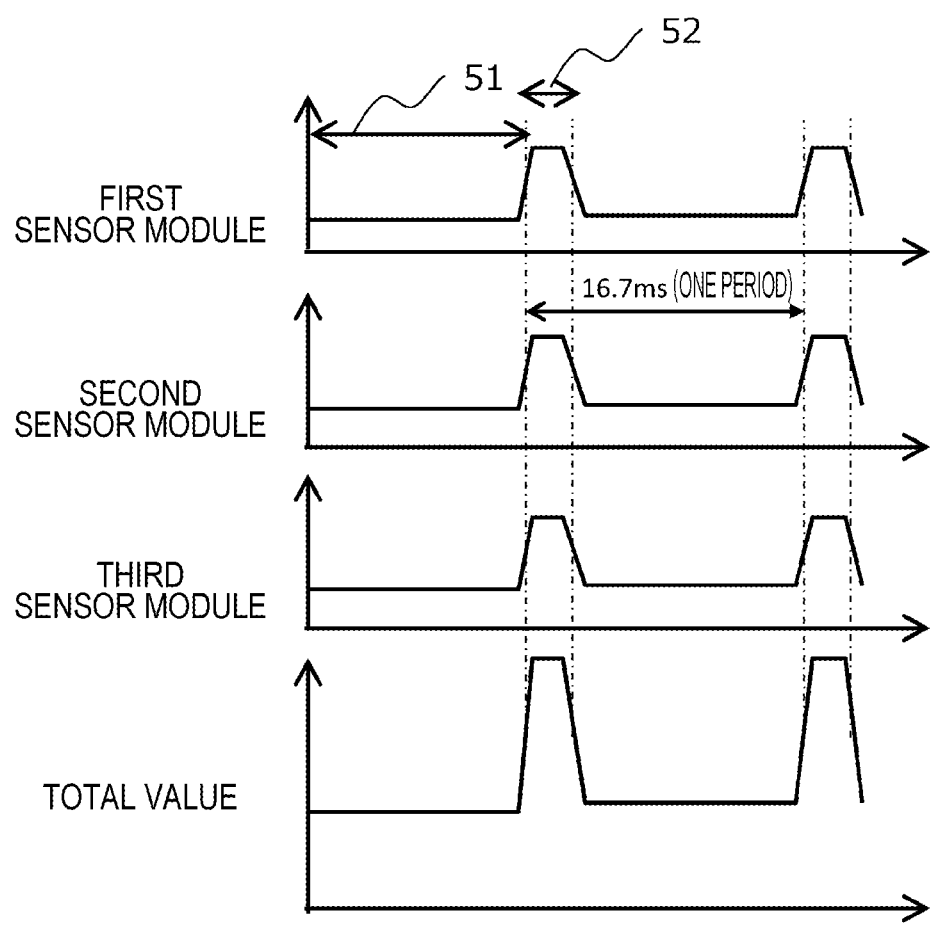
FIG. 3 is a schematic diagram illustrating voltage waveforms before phase adjustment by a phase adjustment unit.

FIG. 3 is a schematic diagram illustrating voltage waveforms before phase adjustment by the phase difference decision unit 32. Referring to each of the four graphs illustrated in FIG. 3, the horizontal axis represents time and the vertical axis represents voltage. The uppermost row of FIG. 3 is a time-series graph illustrating the fluctuation of the power supply voltage in a case where it is assumed that an independent power supply is connected only to the first sensor module 11. Since the power supply unit 22 is actually shared by the three sensor modules as illustrated in FIG. 1, the waveform of the graph illustrated in the upper row of FIG. 3 cannot be measured in the configuration illustrated in FIG. 1.

The second row of FIG. 3 is a time-series graph illustrating the fluctuation of the power supply voltage in a case where it is assumed that an independent power supply is connected only to the second sensor module 12. The third row of FIG. 3 is a time-series graph illustrating the fluctuation of the power supply voltage in a case where it is assumed that an independent power supply is connected only to the third sensor module 13. The fourth row of FIG. 3 is a time-series graph showing the sum of the voltage values shown in the first to third rows of FIG. 3.

As illustrated in the first to third rows of FIG. 3, in each of the sensor modules of the sensor module group 1, the voltage value is smaller in the processing period 51 than in the standby period 52. This is because the processing load of each of the sensor modules of the sensor module group 1 in the processing period 51 is larger than that in the standby period 52. Referring to FIG. 3, since the phase is not adjusted by the phase difference decision unit 32, the phases of the sensor module group 1 are aligned, and it can be seen that the total of the voltages illustrated in the fourth row of FIG. 3 has large voltage fluctuation. The time-series change corresponding to the fourth row of FIG. 3 can be measured by the power supply unit 22.

Figure 4:
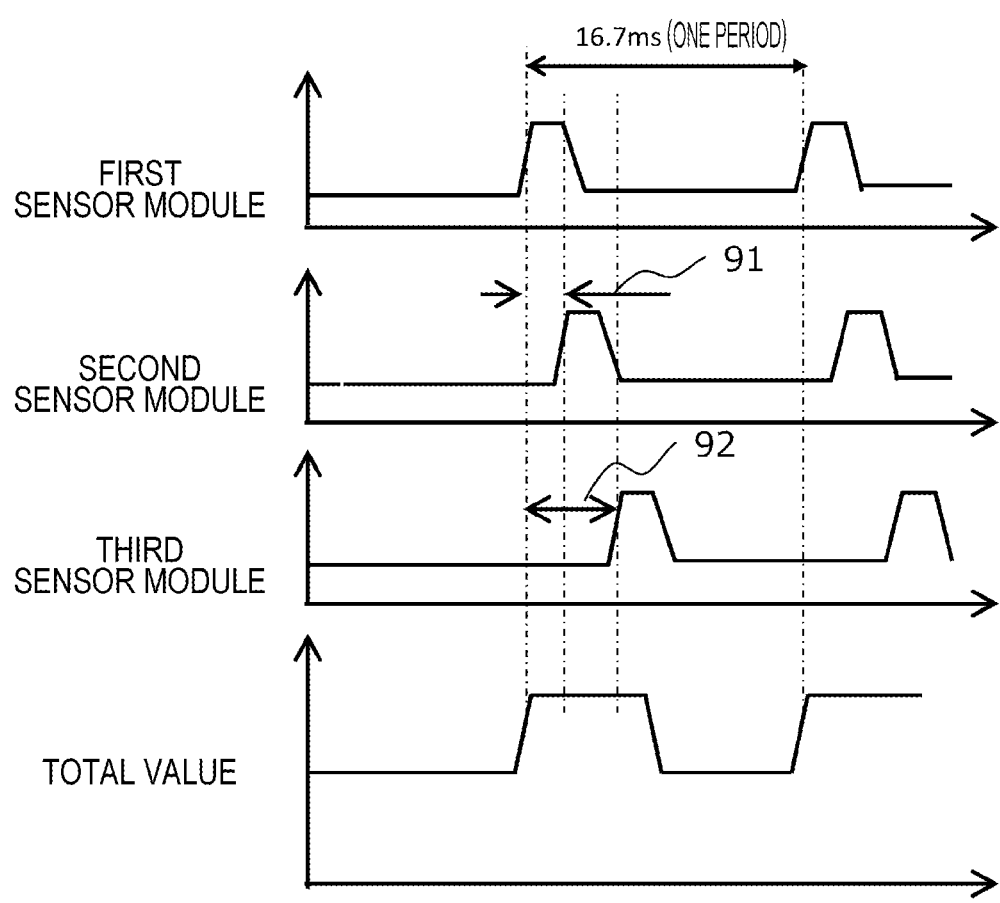
FIG. 4 is a schematic diagram illustrating voltage waveforms after phase adjustment by a phase adjustment unit.

FIG. 4 is a schematic diagram illustrating voltage waveforms after phase adjustment by the phase difference decision unit 32. The four graphs illustrated in FIG. 4 correspond to the four graphs illustrated in FIG. 3. The second sensor module 12 and the third sensor module 13 differ in timing between the voltage waveforms in FIG. 4 and the voltage waveforms before the phase adjustment illustrated in FIG. 3. More specifically, the first sensor module and the second sensor module 12 have a phase difference of a first phase difference 91, and the first sensor module and the third sensor module 13 have a phase difference of a second phase difference 92. Accordingly, the total of the voltages illustrated in the lowermost row of FIG. 4 has smaller fluctuation than that in the lowermost row of FIG. 3.

Figure 5:
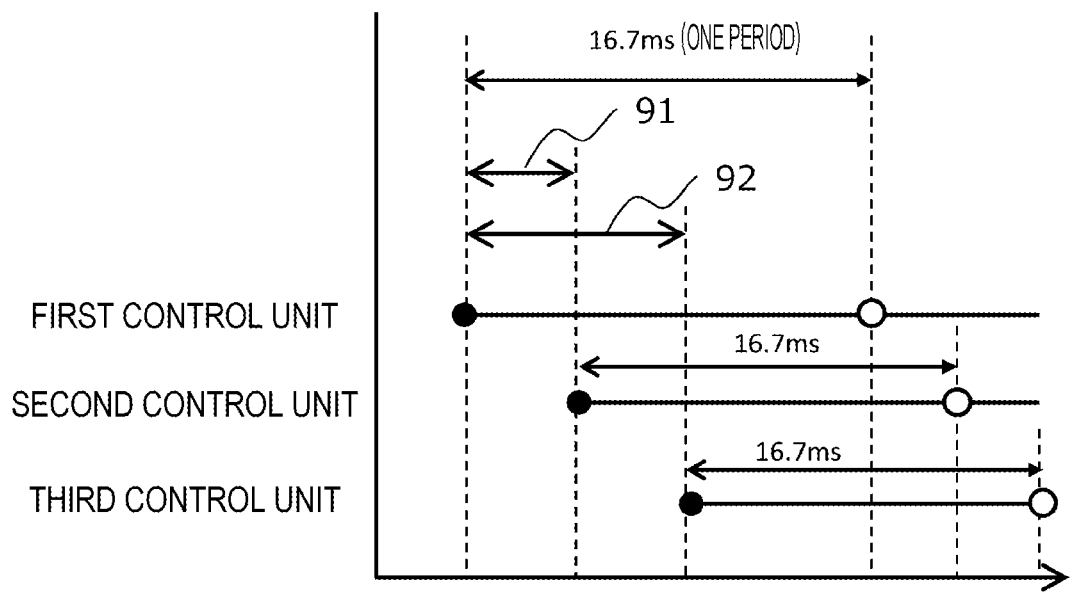
FIG. 5 is a schematic diagram of a first example illustrating phase difference settings by a control unit.
Figure 6:
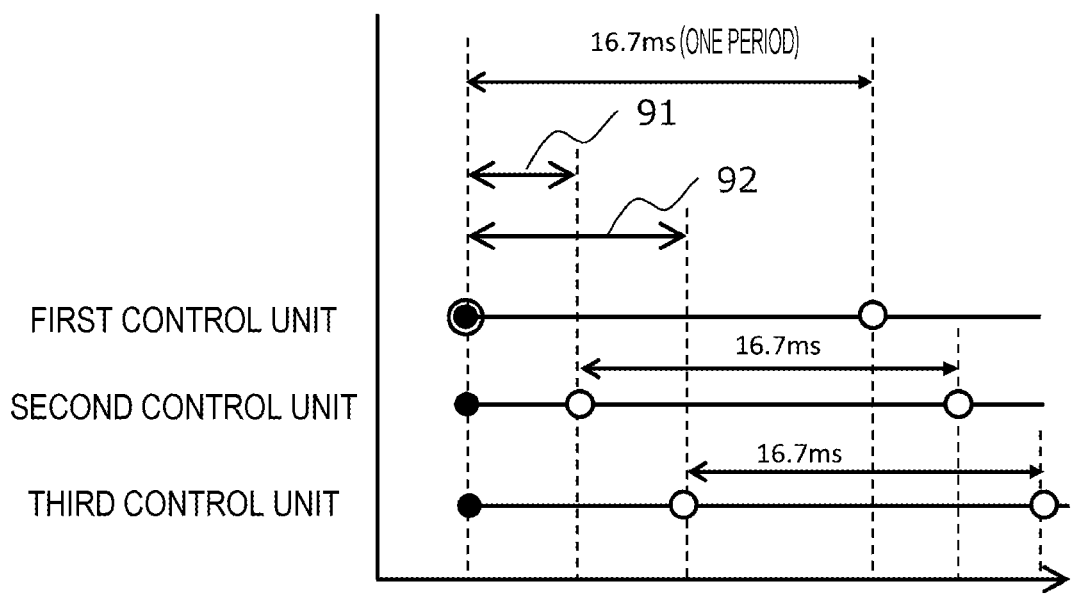
FIG. 6 is a schematic diagram of a second example illustrating phase difference settings by a control unit.

With reference to FIGS. 5 and 6, two phase difference setting methods by the control unit 33 will be described. However, in the example described here, it is assumed that the data acquisition cycle is 16.7 ms, and the phase difference decision unit 32 calculates the first phase difference 91 and the second phase difference 92 as in the example illustrated in FIG. 4. Note that the types of phase difference settings made by the control unit 33 is not limited to the following two types.

FIG. 5 is a schematic diagram of the first example illustrating the phase difference setting made by the control unit 33. In this first example, the whole sensor module group 1 is set in advance such that that the data acquisition cycle is 16.7 ms and the offset between the reference timing and the timing of receiving the first clock signal is 0. Referring to FIG. 5, time passes from left to right in the drawing. Referring to FIG. 5, the black circles each indicate the timing at which the control unit 33 starts outputting a clock signal.

In the first example illustrated in FIG. 5, the first control unit 331 first starts outputting a clock signal, and then the second control unit 332 starts outputting a clock signal after a time corresponding to the first phase difference 91. Finally, the third control unit 333 starts outputting the clock signal after a time corresponding to the second phase difference 92 from the start of the output by the first control unit 331. Since one period of the data acquisition cycle of the sensor module group 1 is set to 16.7 ms, the first sensor module 11, the second sensor module 12, and the third sensor module 13 operate such that the timing of every 16.7 ms after each module starts receiving a clock signal is the start time of a data acquisition cycle.

Accordingly, the sensor module group 1 operates while maintaining the first phase difference 91 and the second phase difference 92. The timing indicated by each white circle in FIG. 5 indicates the start time of the second data acquisition cycle in each sensor module of the sensor module group 1. Thereafter, each sensor module of the sensor module group 1 operates with every 16.7 ms as the start time of the data acquisition cycle. Accordingly, as illustrated in FIG. 4, the voltage fluctuation in the power supply unit 22 is suppressed.

FIG. 6 is a schematic diagram of the second example illustrating the phase difference setting made by the control unit 33. In this second example, although a data acquisition cycle is set to 16.7 ms in advance, no offset is set between the reference timing and the timing of receiving the first clock signal. In the second example, the phase difference decision unit 32 notifies each of the control units 33 of the offset. Each of the control units 33 notifies each of the sensor modules of the sensor module group 1 of the notified offset value. Each of the sensor modules of the sensor module group 1 stores the notified offset value in a storage unit (not illustrated). This offset value is shown below in FIG. 6.

That is, in the first sensor module 11, a reference offset is set to 0. The offset of the second sensor module 12 is set to a time corresponding to the first phase difference 91. The offset of the third sensor module 13 is set to a time corresponding to the second phase difference 92. Thereafter, the phase difference decision unit 32 outputs a command to start outputting a clock signal to the control unit 33 at the same time.

In the upper part of FIG. 6, each black circle indicates the timing at which the control unit 33 starts outputting the clock signal, and each white circle indicates the start time of the data acquisition cycle recognized by the sensor module corresponding to each control unit 33. However, since the first white circle corresponding to the first sensor module 11 overlaps the black circle, the size of the white circle is written to be larger than the others. As illustrated in the upper part of FIG. 6, in the second example, the output timings of the clock signals are the same. However, since the start time of the data acquisition cycle of each sensor module is shifted according to the offset set for each sensor module, the same effect as that of the first example can be obtained also in the second example.

Figure 7:
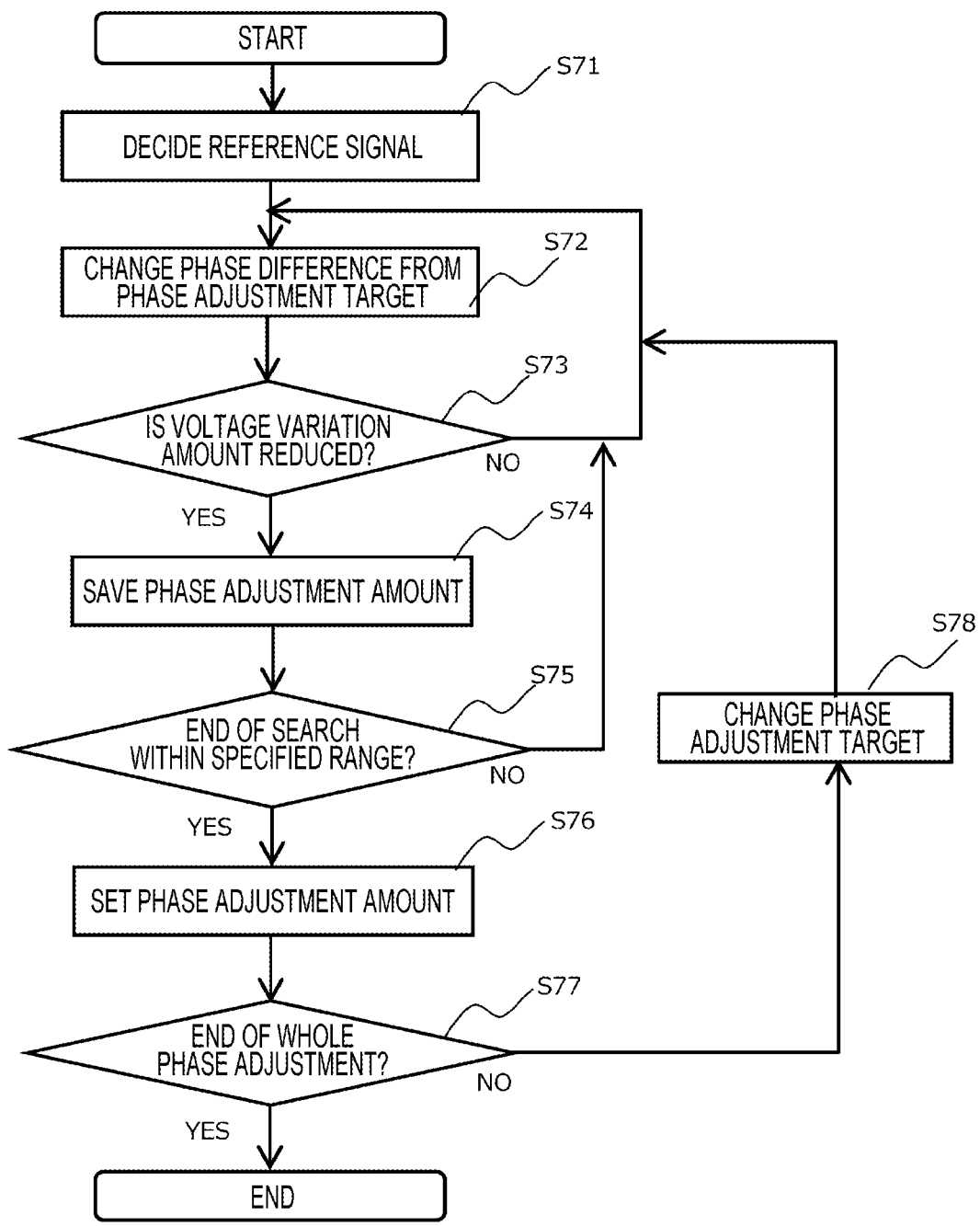
FIG. 7 is a flowchart illustrating the operation of an ECU in the first embodiment.

FIG. 7 is a flowchart illustrating the operation of the ECU 2. The ECU 2 executes the processing illustrated in FIG. 7 each time the ECU 2 is activated. First, in step S71, the phase difference decision unit 32 of the ECU 2 decides a sensor module to be a phase adjustment reference from the sensor module group 1. For example, the phase difference decision unit 32 may select any predetermined sensor module or may select a sensor module having the largest voltage fluctuation amount.

In subsequent step S72, the phase difference decision unit 32 selects one of the signals that are phase adjustment targets and have not been set as reference signals, and changes the phase difference from the reference signal. However, the control unit 33 changes the phase difference. Various known methods can be used to change the phase. For example, the amount of phase difference to be shifted per one time is determined, and the phase is shifted a plurality of times within a specified search range. The search range here is a data acquisition cycle, that is, 16.7 milliseconds in the example in the present embodiment.

In subsequent step S73, the phase difference decision unit 32 determines whether or not the feature amount calculated by the acquisition unit 31 has decreased due to the phase difference change in step S72. In other words, the phase difference decision unit 32 determines whether or not the voltage fluctuation amount in the power supply unit 22 has decreased. The phase difference decision unit 32 proceeds to step S74 upon determining that the voltage fluctuation amount has decreased and returns to step S72 when determining that the voltage fluctuation amount has not decreased. In step S74, the phase difference decision unit 32 saves the information of the phase difference changed in step S72 in a register or the like. This value is updated when a phase difference that reduces a change in the voltage variation amount more than the current phase difference is found.

In subsequent step S75, the phase difference decision unit 32 determines whether or not the search for the phase difference within the specified range has been completed. Upon determining that the search has ended, the phase difference decision unit 32 proceeds to step S76. Upon determining that the search has not ended, the phase difference decision unit returns to step S72. In step S76, the phase difference decision unit 32 sets the phase adjustment amount saved in step S74 as the corresponding phase adjustment target.

In step S77, the phase difference decision unit 32 determines whether or not the phase adjustment of all the adjustment targets has been completed. Upon determining that all the phase adjustments are completed, the phase difference decision unit 32 terminates the processing illustrated in FIG. 5. Upon determining that all the phase adjustments are not completed, the process proceeds to step S78. In step S78, the phase difference decision unit 32 changes the phase adjustment target to a sensor module not having undergone phase intelligence.

According to the first embodiment described above, the following operational effects can be obtained.

(1) The ECU 2, which is an electronic control device, is connected via a cable to each of sensor modules incorporating a plurality of sensors that output a sensor output for each data acquisition cycle determined in advance in accordance with a clock signal. The ECU 2 includes the power supply unit 22 that supplies power to a sensor via a cable, the acquisition unit 31 that acquires a feature amount directly or indirectly indicating the magnitude of radiation noise from at least one sensor among a plurality of sensors, the phase difference decision unit 32 that decides a phase difference of a data acquisition cycle for each of the plurality of sensors on the basis of the feature amount, and the control unit 33 that transmits the phase difference to each of the plurality of sensors. Accordingly, as illustrated in FIG. 4, the phase difference of the data acquisition cycle can be set to suppress radiation noise.

(2) The control unit 33 transmits the phase difference using the start timing of the clock signal output to each of the plurality of sensors as illustrated in FIG. 5 or transmits numerical information indicating the phase difference to each of the plurality of sensors as illustrated in FIG. 6.

(3) The acquisition unit 31 acquires the voltage fluctuation in the power supply unit 22 as a feature amount indirectly indicating the magnitude of radiation noise. Accordingly, it is possible to reduce radiation noise at low cost without requiring a dedicated measurement sensor.

(4) The sensor module group 1 includes a camera. Since the camera greatly increases or decreases in power consumption in a data acquisition cycle, the radiation noise can be greatly reduced by setting an appropriate phase difference as illustrated in FIG. 4.

(5) The sensor module group 1 includes a plurality of types of sensors. The method of reducing radiation noise by adjusting the phase difference in a data acquisition cycle according to the present embodiment is not limited to one type of sensor. Accordingly, even when a plurality of types of sensors are included in the sensor module group 1, the effect of reducing radiation noise can be exhibited.

First Modification

Figure 8:
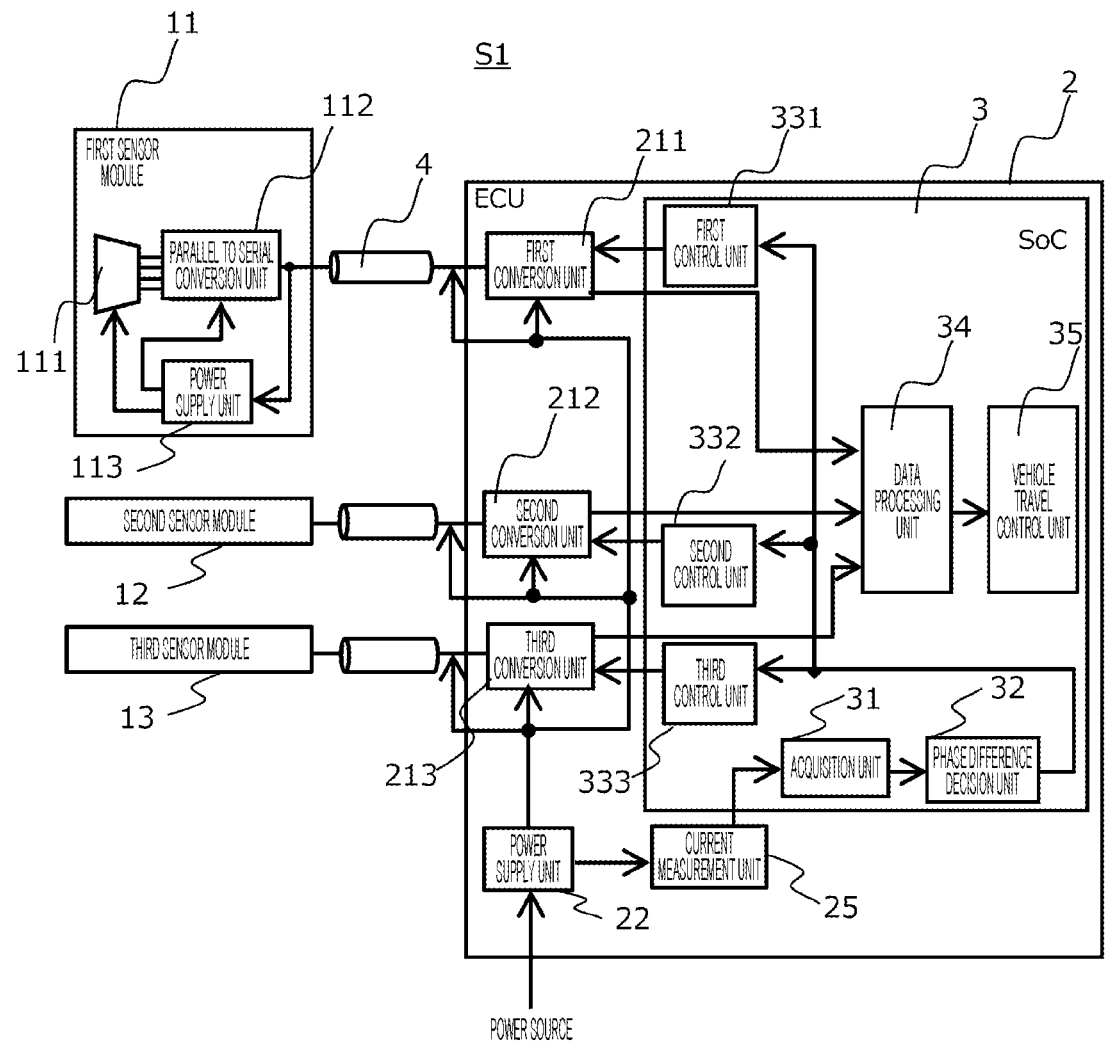
FIG. 8 is an overall configuration diagram of an in-vehicle system according to the first modification.

FIG. 8 is an overall configuration diagram of an in-vehicle system S according to the first modification. In the present modification, the EU 2 further includes a current measurement unit 25. The current measurement unit 25 is, for example, a current monitor. The current measurement unit 25 may be incorporated in another component such as the power supply unit 22 if possible. The current measurement unit 25 measures the current in the power supply unit 22 and outputs the current to the acquisition unit 31. Ohm's Law indicates that the current and the voltage are proportional. Therefore, for the same reason as that the voltage change amount can be used as a feature amount in the first embodiment, the information on the magnitude of the radiation noise can be indirectly acquired also with respect to the current change amount.

The acquisition unit 31 calculates a feature amount using a current instead of a voltage. A method of calculating a feature amount in the acquisition unit 31 is similar to that according to the first embodiment. Since the processing by the phase difference decision unit 32 is also similar to that according to the first embodiment, a description thereof is omitted.

Second Modification

It is desirable that the power consumption of the sensor module group 1 be large during processing by the phase difference decision unit 32. For this reason, the phase difference decision unit 32 may output an operation command for increasing the power consumption to the sensor module group 1 via the control unit 33. For example, when the sensor 111 is a camera, the phase difference decision unit 32 outputs, to the first sensor module 11, a command to capture an image with the maximum number of pixels and the maximum number of gradations. When the sensor 111 is a laser range scanner, a command for maximizing the output of the laser is output.

When the sensor module group 1 includes a camera, the sensor module group 1 may be moved to a dark place. This is because the setting of the camera is changed by automatic processing in a dark place, and it is expected that the power consumption increases.

Third Modification

In the first embodiment, the magnitude of radiation noise is indirectly measured. However, the magnitude of radiation noise may be directly measured. For example, an antenna may be installed near the transmission path 4 to measure the electric power generated by the electromagnetic field applied to the antenna. In this case, the magnitude of the power generated by the antenna is a feature amount. According to the third modification, the magnitude of radiation noise can be directly measured.

Fourth Modification

In the first embodiment described above, the phase difference is adjusted for all the sensor modules constituting the sensor module group 1. However, the phase difference between at least two sensor modules may be adjusted. For example, the phase of the second sensor module 12 may be adjusted with reference to the first sensor module 11, and the phase of the third sensor module 13 may not be adjusted.

Second Embodiment

The second embodiment of an electronic control device will be described with reference to FIGS. 9 to 10. In the following description, the same components as those of the first embodiment are denoted by the same reference numerals, and differences will be mainly described. Those which are not specifically described are the same as in the first embodiment. The present embodiment is different from the first embodiment mainly in that the calculation result obtained by the phase adjustment unit is recorded.

Figure 9:
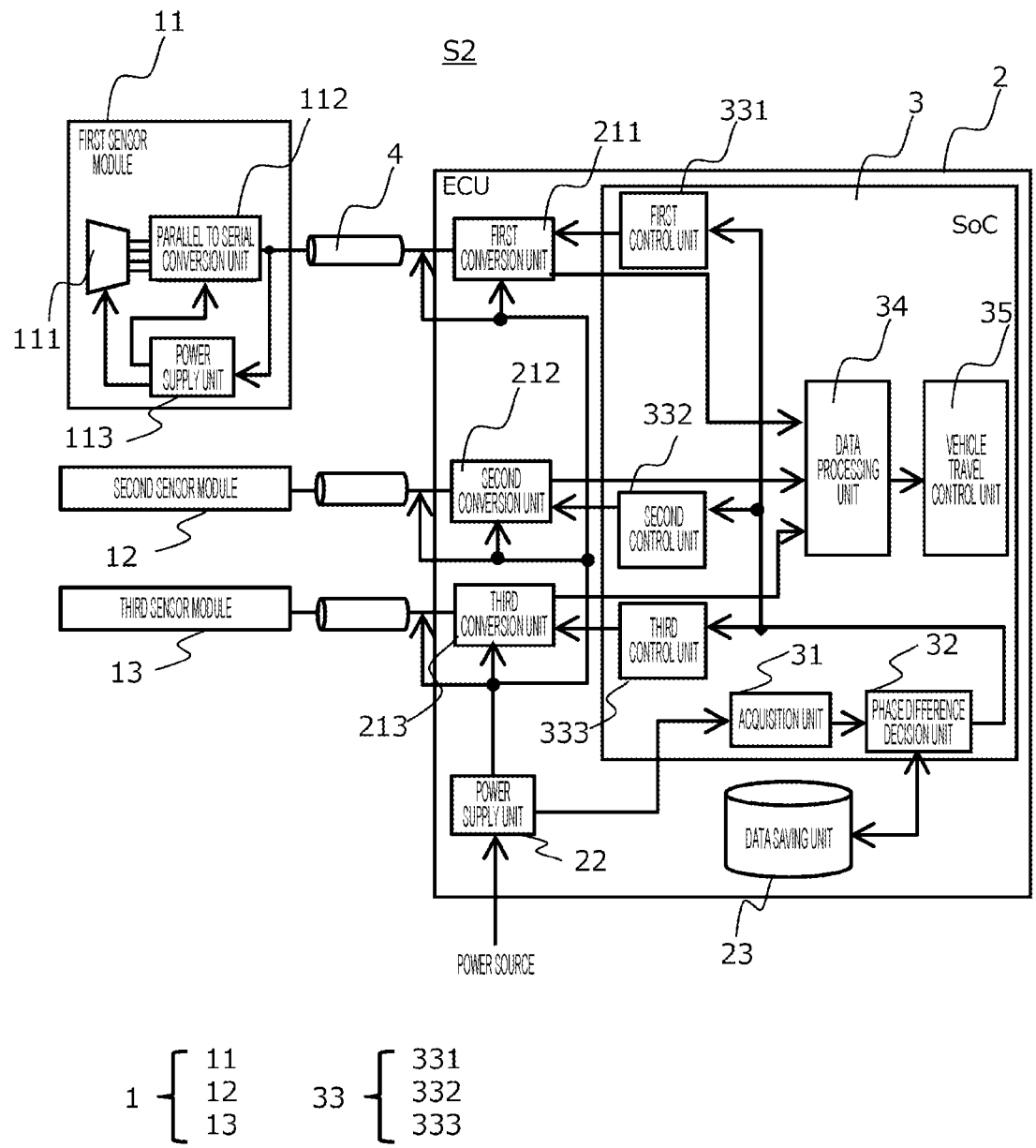
FIG. 9 is an overall configuration diagram of an in-vehicle system according to the second embodiment.

FIG. 9 is an overall configuration diagram of an in-vehicle system S2 including an ECU 2 which is an electronic control device. The ECU 2 according to the present embodiment further includes a data saving unit 23 which is a nonvolatile storage area in addition to the configuration according to the first embodiment. The data saving unit 23 stores the calculation result obtained by a phase difference decision unit 32. In the present embodiment, when data is saved in the data saving unit 23, the phase difference decision unit 32 uses the data, whereas only when no data is saved, the phase difference decision unit 32 performs the operation described in the first embodiment.

Figure 10:
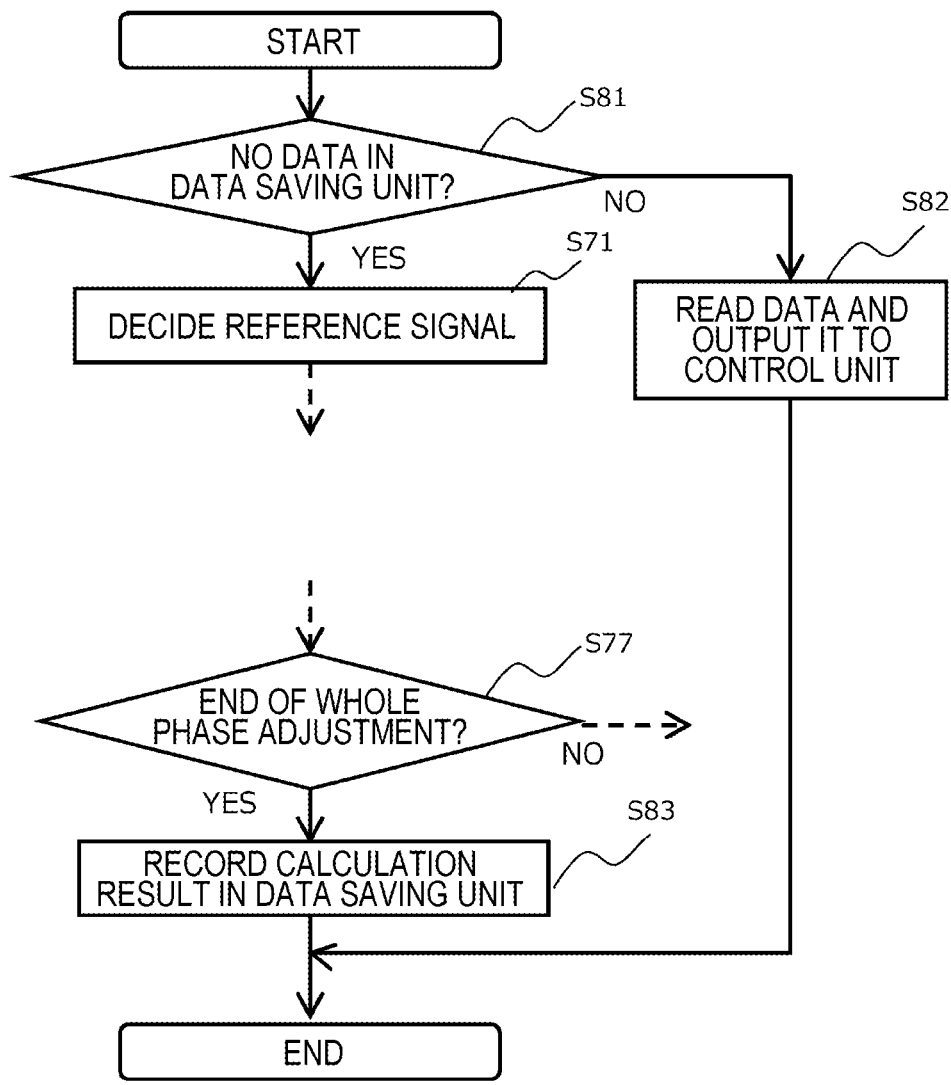
FIG. 10 is a flowchart illustrating the operation of an ECU in the second embodiment.

FIG. 10 is a flowchart illustrating the operation of the ECU 2 in the second embodiment. However, referring to FIG. 10, a description of steps S71 to S78, which are processes similar to those in the first embodiment, is omitted. The ECU 2 executes the processing illustrated in FIG. 10 each time the ECU 2 is activated. First of all, in step S81, the ECU 2 first checks the presence or absence of data in the data saving unit 23. Upon determining that there is no data, the process proceeds to step S71 to perform the same process as in the first embodiment. Since the processing in steps S71 to S77 is similar to that in the first embodiment, a description of the processing will be omitted.

If the ECU 2 determines in step S81 that data is saved in the data saving unit 23, the process proceeds to step S82. In step S82, the phase difference decision unit 32 reads the data saved in the data saving unit 23, outputs the data to a control unit 33, and terminates the processing illustrated in FIG. 10. Upon making an affirmative determination in step S77, the ECU 2 records the calculation result obtained by the phase difference decision unit 32 in the data saving unit 23 in step S83, and terminates the processing illustrated in FIG. 10.

According to the second embodiment described above, the following operational effects can be obtained.

(6) The ECU 2 includes the data saving unit 23 that stores the phase difference decided by the phase difference decision unit 32. Accordingly, the phase difference decision unit 32 can use a past calculation result.

First Modification of Second Embodiment

Figure 11:
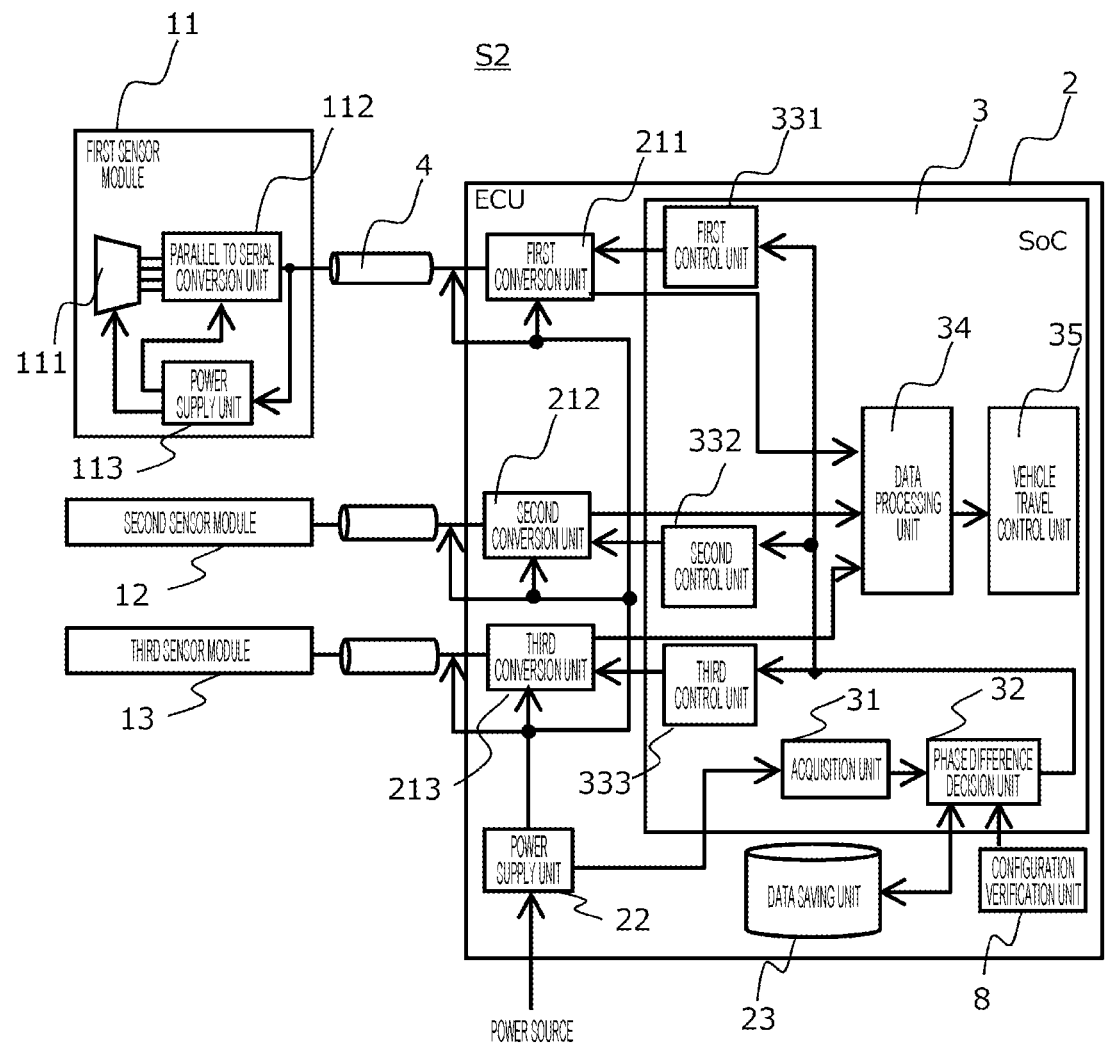
FIG. 11 is an overall configuration diagram of an in-vehicle system in the first modification of the second embodiment.

FIG. 11 is an overall configuration diagram of the in-vehicle system S2 in the first modification of the second embodiment. The ECU 2 is different from the second embodiment in that the ECU 2 further includes a configuration verification unit 8 that verifies the configuration of a sensor module group 1 and the software incorporated in the ECU 2. The operation of the phase difference decision unit 32 is also different as described below.

The configuration verification unit 8 is connected to a data processing unit 34 via a signal line (not illustrated) and acquires a version of software executed by the data processing unit 34 and the detailed information of the sensor module group 1, for example, the model number of a first sensor module 11 and the data acquisition cycle. Hereinafter, the information collected by the configuration verification unit 8 is referred to as "configuration information". The configuration verification unit 8 compares the configuration information stored in the data saving unit 23 with the acquired configuration information and operates the phase difference decision unit 32 when the configuration information and the acquired configuration information are different from each other. The configuration verification unit 8 records the calculation result obtained by the phase difference decision unit 32 in the data saving unit 23 together with the configuration information.

Figure 12:
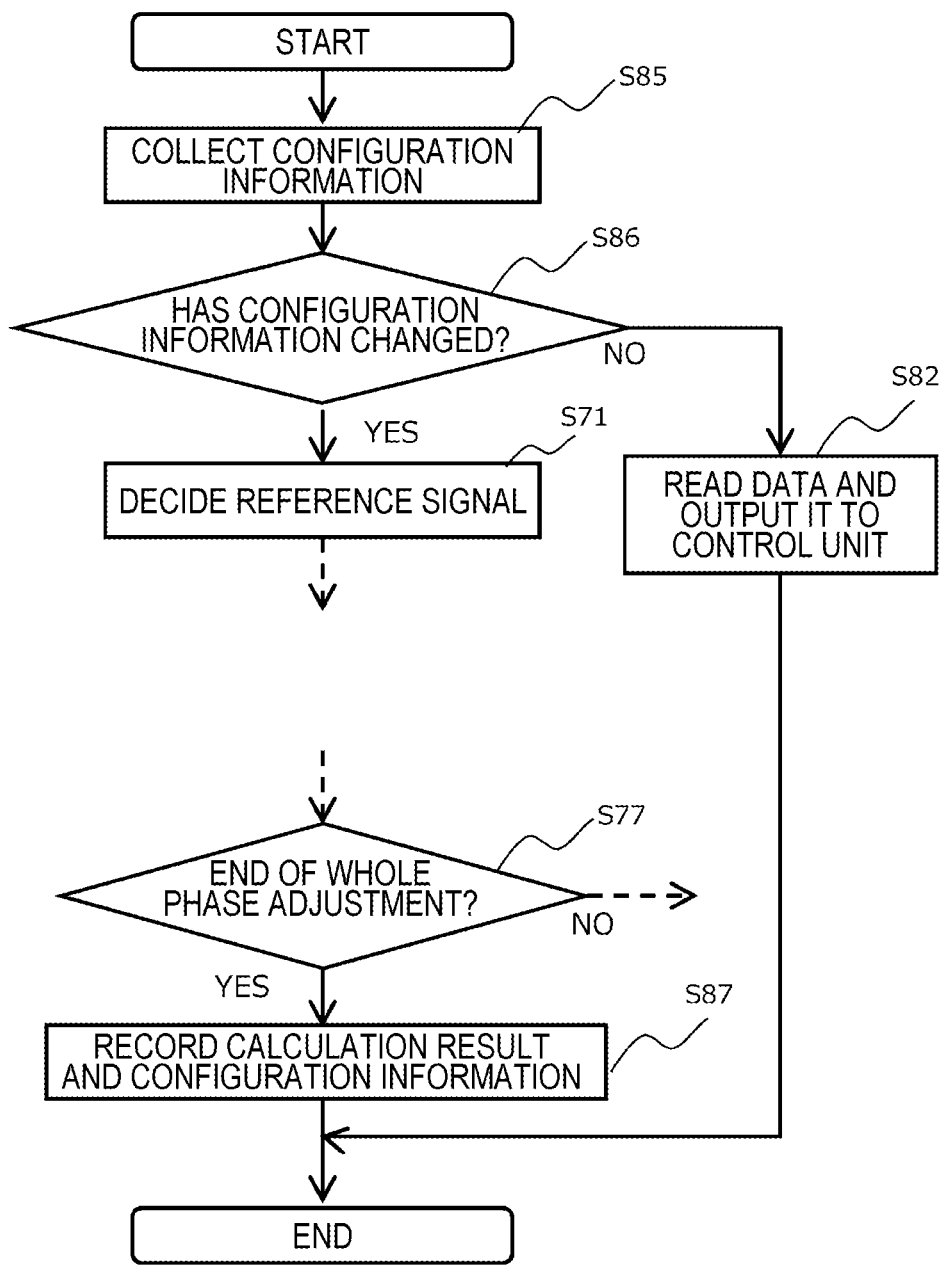
FIG. 12 is a flowchart illustrating the operation of an ECU in the first modification of the second embodiment.

FIG. 12 is a flowchart illustrating the operation of the ECU 2 according to the first modification of the second embodiment. However, referring to FIG. 12, a description of steps S71 to S78, which are processes similar to those in the first embodiment, is omitted. The ECU 2 executes the processing illustrated in FIG. 12 each time the ECU 2 is activated. The configuration verification unit 8 of the ECU 2 first collects configuration information in step S85. In subsequent step S86, the configuration verification unit 8 compares the configuration information acquired in step S85 with the configuration information stored in the data saving unit 23. Upon determining that the configuration information has changed, the configuration verification unit 8 proceeds to step S71 and performs processing similar to that of the first embodiment. Since the processing in steps S71 to S77 is similar to that in the first embodiment, a description of the processing will be omitted.

In step S86, when the configuration verification unit 8 determines that the configuration information has not changed, the process proceeds to step S82. Since the processing in and after step S82 is similar to that in the second embodiment, a description of the processing will be omitted. Upon making an affirmative determination in step S77, the ECU 2 records the calculation result obtained by the phase difference decision unit 32 in the data saving unit 23 in step S87, and terminates the processing illustrated in FIG. 12.

According to the present modification, the following operational effects can be obtained.

(7) The ECU 2 includes the configuration verification unit 8 that verifies the configurations of a plurality of sensors. When the configuration verification unit 8 detects that the configurations of the plurality of sensors have changed, the phase difference decision unit 32 determines a phase difference. Therefore, the ECU 2 checks whether or not the configuration is changed at the time of activation and can use the phase difference stored in the data saving unit 23 when there is no change.

Second Modification of Second Embodiment

In the first modification of the second embodiment, only one set of the configuration information and the calculation result obtained by the phase difference decision unit 32 is saved in the data saving unit 23. However, the plurality of pieces of configuration information and the calculation results obtained by the phase difference decision unit 32 which correspond to the respective pieces of configuration information may be saved in the data saving unit 23. In this case, the configuration verification unit 8 searches the data saving unit 23 for configuration information matching acquired configuration information and reads the calculation result obtained by the phase difference decision unit 32 which corresponds to the matching configuration information. When the configuration information matching the acquired configuration information is not stored in the data saving unit 23, the configuration verification unit 8 causes the phase difference decision unit 32 to perform calculation and adds the calculation result and the acquired configuration information to the data saving unit 23.

According to the present modification, it is possible to read the phase difference calculated in the past, and it is not necessary to perform calculation by the phase difference decision unit 32 as long as the configuration is the same.

Third Modification of Second Embodiment

The second embodiment has exemplified the case where the data saving unit 23 is built in the ECU 2. However, a storage medium may be prepared outside the ECU 2 and used as the data saving unit 23. In this case, the ECU 2 has a connection interface for the data saving unit 23 instead of the data saving unit 23.

Third Embodiment

The third embodiment of an electronic control device will be described with reference to FIG. 13. In the following description, the same components as those of the first embodiment are denoted by the same reference numerals, and differences will be mainly described. Those which are not specifically described are the same as in the first embodiment. The present embodiment is different from the first embodiment mainly in that phase adjustment is performed in accordance with the situation after the activation of the ECU.

Figure 13:
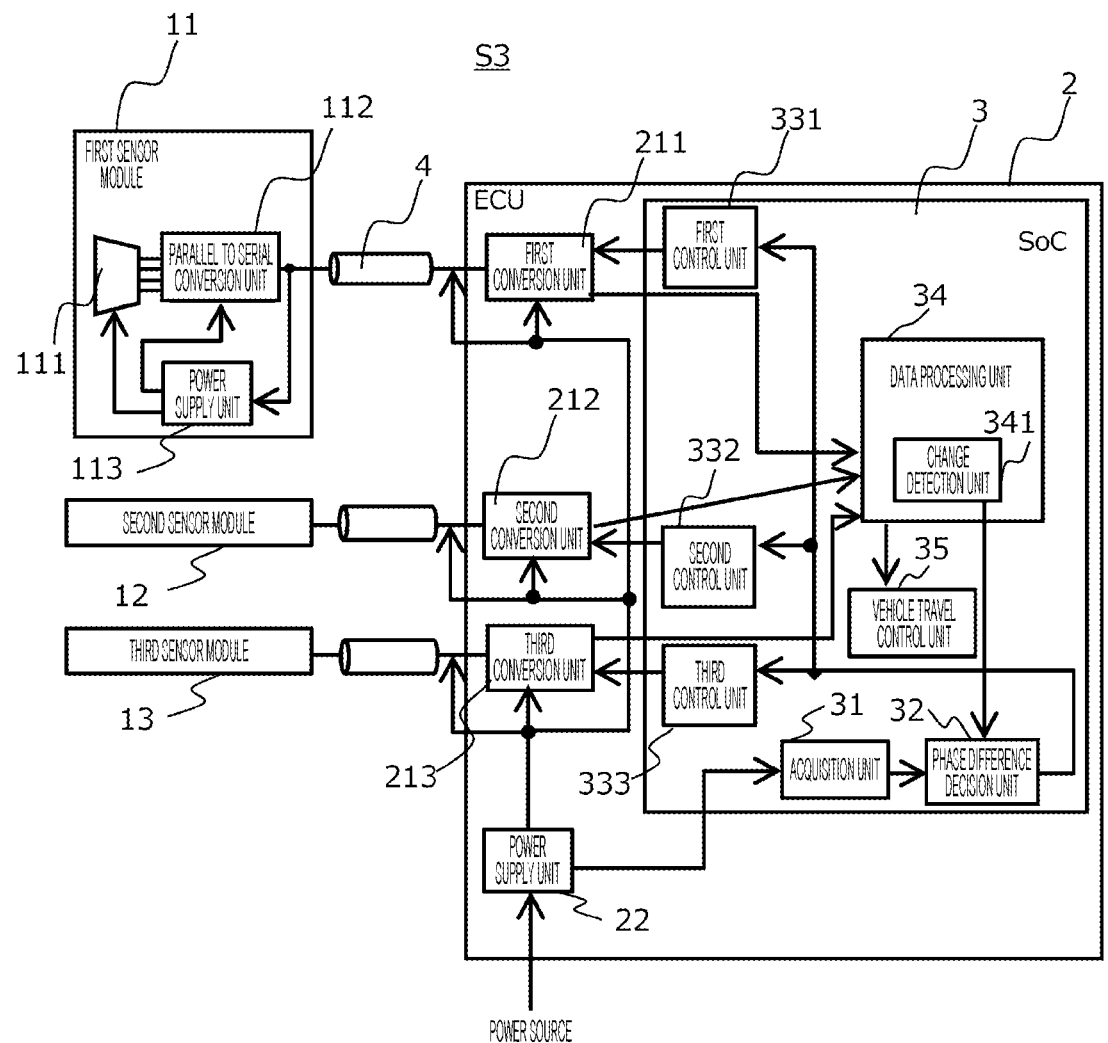
FIG. 13 is an overall configuration diagram of an in-vehicle system according to the third embodiment.

FIG. 13 is an overall configuration diagram of an in-vehicle system S3 including an ECU 2 which is an electronic control device. The in-vehicle system S3 is different in that a data processing unit 34 includes a change detection unit 341. The change detection unit 341 detects a change in the operating condition of each sensor by using the sensor information received from a sensor module group 1. Upon detecting a change in the operating condition of each sensor, the change detection unit 341 causes the phase difference decision unit 32 to adjust the phase difference. This is based on the idea that when the operating condition of the sensor changes, a processing period 51 illustrated in FIG. 2 changes and the timing at which the power consumption of each sensor module of the sensor module group 1 increases or decreases is also affected, and hence the phase needs to be adjusted again even after the activation of the ECU 2.

Various methods can be used for the detection of a change in operating condition by the change detection unit 341. In this case, a case where the sensor 111 is a camera and a case where the sensor is a laser range scanner will be specifically exemplified.

In the case where the sensor 111 is a camera and the sensor output is a captured image, the change detection unit 341 detects a change in operation condition with reference to the luminance of the captured image. For example, by detecting that the average value of the luminance of the captured image is low, it is estimated that the operation condition of the exposure time has changed. This is based on the premise that the exposure time is automatically adjusted to be long by automatic adjustment of the camera since the amount of light per unit time which enters the imaging device decreases when the surroundings become dark.

In the case where the sensor 111 is a laser range scanner and the sensor output is a distance to an obstacle at a predetermined angular interval, the change detection unit 341 detects a change in operating condition with reference to the number of data included in the sensor output. This is because a change in the number of data means an increase or decrease in the scanning range of the laser range scanner, and hence the processing period 51 changes.

According to the third embodiment described above, the following operational effects can be obtained.

(8) The ECU 2 includes the change detection unit 341 that detects a change in the operating condition of each of the plurality of sensors. When change detection unit 341 detects a change, the phase difference decision unit 32 decides a phase difference. Therefore, the ECU 2 can set the phase difference of the data acquisition cycle of the sensor module group 1 not only at the time of activation of the ECU 2 but also as necessary.

(9) The sensors of the sensor module group 1 include a camera. The change detection unit 341 detects a change in the operating condition of the sensor by referring to the luminance of a captured image which is the sensor output of the sensor which is a camera. Therefore, for example, when the vehicle travels from a sunny environment into a dark tunnel and the exposure time of the camera becomes long, the phase difference of the data acquisition cycle is set again, and the radiation noise is reduced.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

The above embodiments and modifications may be combined. Although various embodiments and modifications have been described above, the present invention is not limited to these contents. Other aspects conceivable within the scope of the technical idea of the present invention are also included within the scope of the present invention.

The disclosure of the following priority application is incorporated herein by reference.

Japanese Patent Application No. 2019-219475 (filed on Dec. 4, 2019)

| Reference Signs List | |
|---|---|
| 1 | sensor module group |
| 111 | sensor |
| 4 | transmission path |
| 8 | configuration verification unit |
| 22 | power supply unit |
| 23 | data saving unit |
| 25 | current measurement unit |
| 31 | acquisition unit |
| 32 | phase difference decision unit |
| 33 | control unit |
| 34 | data processing unit |
| 33 | control unit |
| 341 | change detection unit |

The invention claimed is:

1. An electronic control device connected via a cable to each of a plurality of sensors which outputs a sensor output for each data acquisition cycle determined in advance in accordance with a clock signal, the electronic control device comprising:
   a power supply configured to supply power to the plurality of sensors via the cable;
   an acquisition circuit configured to acquire a feature amount directly or indirectly indicating a magnitude of radiation noise from at least one sensor among the plurality of sensors;
   a phase difference decision circuit configured to decide a phase difference of a data acquisition cycle for each of the plurality of sensors based on the feature amount; and
   a control circuit configured to transmit the phase difference to each of the plurality of sensors.

2. The electronic control device according to claim 1, wherein the control circuit transmits the phase difference using a start timing of a clock signal output to each of the plurality of sensors or transmits numerical information indicating the phase difference to each of the plurality of sensors.

3. The electronic control device according to claim 1, wherein the acquisition circuit acquires a variation in any of a voltage and a current in the power supply as a feature amount indirectly indicating a magnitude of the radiation noise.

4. The electronic control device according to claim 1, further comprising a data saving circuit configured to store the phase difference decided by the phase difference decision circuit.

5. The electronic control device according to claim 1, further comprising a configuration verification circuit configured to verify configurations of the plurality of sensors,
   wherein when the configuration verification circuit detects that the configurations of the plurality of sensors have changed, the phase difference decision circuit decides the phase difference.

6. The electronic control device according to claim 1, further comprising a change detection circuit configured to detect a change in an operating condition of the plurality of sensors,
   wherein the phase difference decision circuit decides the phase difference when the change detection circuit detects a change.

7. The electronic control device according to claim 6, wherein
   the plurality of sensors include a camera, and
   the change detection circuit detects a change in an operating condition of the plurality of sensors by referring to a luminance of a captured image that is a sensor output of the sensor that is a camera.

8. The electronic control device according to claim 1, wherein the plurality of sensors include a camera.

9. The electronic control device according to claim 1, wherein the plurality of sensors include a plurality of types of sensors.

10. A control method executed by an electronic control device connected via a cable to each of a plurality of sensors which outputs a sensor output for each data acquisition cycle determined in advance in accordance with a clock signal and including a power supply configured to supply power to the sensor via the cable, the control method comprising:
    acquiring a feature amount directly or indirectly indicating a magnitude of radiation noise from at least one sensor among the plurality of sensors;

deciding a phase difference of a data acquisition cycle for each of the plurality of sensors based on the feature amount; and transmitting the phase difference to each of the plurality of sensors.

11. The control method according to claim 10, wherein a variation in any of a voltage and a current in the power supply is acquired as a feature amount indirectly indicating a magnitude of the radiation noise.

12. The control method according to claim 10, further comprising deciding a phase difference of a data acquisition cycle for each of the plurality of sensors based on the feature amount when a change in configurations of the plurality of sensors is detected.

13. The control method according to claim 10, further comprising deciding a phase difference of a data acquisition cycle for each of the plurality of sensors based on the feature amount when a change in operating condition in the plurality of sensors is detected.

14. The control method according to claim 13, wherein the plurality of sensors include a camera, and a change in an operating condition of the plurality of sensors is detected by referring to a luminance of a captured image that is a sensor output of the sensor that is a camera.

15. A sensor system comprising:

a plurality of sensors configured to output a sensor output for each data acquisition cycle determined in advance in accordance with a clock signal; and an electronic control device connected to the plurality of sensors via a cable, the electronic control device including:

a power supply configured to supply power to the plurality of sensors sensor via the cable, an acquisition circuit configured to acquire a feature amount directly or indirectly indicating a magnitude of radiation noise from at least one sensor among the plurality of sensors, a phase difference decision circuit configured to decide a phase difference of a data acquisition cycle for each of the plurality of sensors based on the feature amount, and a control circuit configured to transmit the phase difference to each of the plurality of sensors.

* * * * *